(12) United States Patent
Caruana (10) Patent No.: US 12,271,211 B2
(45) Date of Patent: Apr. 8, 2025

(54) FAIL OPEN VALVE

(71) Applicant: TCO AS, Indre Arna (NO)

(72) Inventor: Adrian Caruana, Fana (NO)

(73) Assignee: TCO AS, Indre Arna (NO)

( * ) Notice: Subject to any disclaimer, the term of this patent is extended or adjusted under 35 U.S.C. 154(b) by 59 days.

(21) Appl. No.: 18/498,248

(22) Filed: Oct. 31, 2023

(65) Prior Publication Data

US 2024/0152165 A1    May 9, 2024

(30) Foreign Application Priority Data

Nov. 3, 2022    (NO) .................................. 20221185

(51) Int. Cl.
| | | |
|---|---|---|
| G05D 16/00 | (2006.01) | |
| E21B 34/00 | (2006.01) | |
| F16K 1/38 | (2006.01) | |
| F16K 1/42 | (2006.01) | |
| F16K 27/02 | (2006.01) | |

(52) U.S. Cl.
CPC ............. *G05D 16/024* (2019.01); *F16K 1/38* (2013.01); *F16K 1/42* (2013.01); *F16K 27/0254* (2013.01); *E21B 34/00* (2013.01)

(58) Field of Classification Search
CPC .......... G05D 16/024; F16K 1/38; F16K 1/42; F16K 27/0254; F16K 17/00; F16K 17/025; F16K 25/00; E21B 34/00; E21B 34/102; E21B 34/103; E21B 33/12; E21B 43/123; E21B 2200/02
See application file for complete search history.

(56) References Cited

U.S. PATENT DOCUMENTS

| | | | | |
|---|---|---|---|---|
| 4,887,638 A | * | 12/1989 | Hellquist | ................. A62B 9/02 137/557 |
| 5,803,073 A | * | 9/1998 | Toth | .................... B63C 11/2227 128/205.24 |
| 5,899,221 A | * | 5/1999 | Holt | ...................... G05D 16/109 137/116.5 |
| 7,159,612 B2 | * | 1/2007 | Henley | ................. G05D 16/103 251/285 |
| 11,137,074 B2 | * | 10/2021 | Suenaga | ............... G05D 16/107 |
| 2002/0079472 A1 | * | 6/2002 | Kumar | ................ F16K 31/0693 251/129.07 |

(Continued)

OTHER PUBLICATIONS

Norwegian Search Report For 20221185; dated Mar. 9, 2023.

*Primary Examiner* — Patrick C Williams
(74) *Attorney, Agent, or Firm* — Flener IP & Business Law; Zareefa B. Flener (57) ABSTRACT

A flow tube including: a pin; a seat; and a guide tube, the pin and the seat are arranged at least partially in the guide tube; and wherein: the flow tube is arranged to have a closed position, wherein: the pin is in contact with the seat and fluid flow through the seat is reduced or prevented; the flow tube is arranged to have an open position, wherein: the pin is not in contact with the seat and fluid flow is increased through the seat when compared to the closed position; and the flow tube is arranged to have a forced open position, wherein: the seat is arranged such that when a force above a threshold force is applied to the seat: the seat moves away from the pin, the pin is not in contact with the seat, and the flow tube cannot move to the closed position again.

15 Claims, 8 Drawing Sheets

(56) References Cited

U.S. PATENT DOCUMENTS

| | | | |
|---|---|---|---|
| 2007/0284004 A1* | 12/2007 | Ungerecht | G05D 16/0655 |
| | | | 137/505.25 |
| 2008/0135255 A1 | 6/2008 | Coronado | |
| 2008/0178946 A1* | 7/2008 | Lea-Wilson | F16K 17/30 |
| | | | 137/460 |
| 2013/0000740 A1 | 1/2013 | Veit | |
| 2017/0254177 A1 | 9/2017 | Woodford | |
| 2021/0156235 A1 | 5/2021 | Yin et al. | |

* cited by examiner

FAIL OPEN VALVE

CROSS-REFERENCE TO RELATED APPLICATIONS

The current application claims priority to Norwegian application N020221185, filed on Nov. 3, 2022, and hereby incorporated by reference in its entirety herein.

FIELD OF INVENTION

The invention is in the field of backpressure valve systems. In particular a flow tube as a portion of such a valve system is described.

BACKGROUND

It is common to use chemical injection in hydrocarbon well production for various reasons, such as to improve oil recovery, remove formation damage, clean blocked perforations or formation layers, reduce or inhibit corrosion, upgrade crude oil, or address crude oil flow-assurance issues. Oil recovery can be improved by improving the primary fluid quality or enhancing the flow of the primary fluid. The specialized chemicals can be injected into the produced oil & gas flow stream from the wellhead or can be injected through an annulus downhole into the oil and gas reservoirs. Injection can be administered continuously, in batches, in injection wells, or in production wells. Injecting the correct amount of chemicals at the correct time is important to achieve the desired effects. This is difficult, and chemical systems often under- or more often overdose, leading to excessive cost and pollution.

During the life of a hydrocarbon well, topside gas compression will usually cause a draw-down in wellbore pressure. This can lead to the wellbore pressure at any injection point to become significantly less than the cumulative hydrostatic pressure in the fluid injection line. Then the fluid in said fluid injection line will overpower the wellbore pressure and allow fluid fall through, causing a vacuum in the upper portion of the injection line. This phenomenon is referred to in the field as U-tubing through hydrostatic fall-through and is very undesired. The region in vacuum in the upper part of the injection line can experience boil-off of fluids, potentially leading to solid deposits falling out and ultimately injection line blockage. In addition, since the upper region where the U-tubing occurs is not hydraulically coupled to the surface, but is a region of gas, there is a lack of hydraulic coupling and no controlled movement of fluid. This is problematic in a fluid injection system, where consistent injection flow is important. U-tubing can be prevented by a backpressure valve system downhole providing resistance to hydrostatic fall-through, and thus allowing the injection line to be held at positive pressure, avoiding vacuum and assuring a hydraulically coupled system to the surface.

Such backpressure valve systems are designed to remain in a passive-open mode during the initial production from the hydrocarbon well, when the reservoir pressure and tubing pressure are both high. But during the late lifecycle of the hydrocarbon well, when enough hydrocarbons have been removed for the reservoir pressure to be lower, the backpressure valve system should activate to provide backpressure support, avoiding hydrostatic fall-through and maintaining a positive pressure in the injection line and securing the hydraulic connection with the surface. Several backpressure valve systems can be installed in series, in which case the bottom one is installed onto the injection mandrel and function as a backpressure and flow regulation device. One or more check valves can be used in the backpressure valve systems in order to avoid return flow from the well.

The backpressure valve system can be designed many ways. In the specific system the present invention was first designed for, its main module is a backpressure regulating module where a pre-charged gas chamber and a metal bellows act as a spring for the valve pin. When the reservoir pressure is high, the applied topside pump pressure overcome the downhole pressure, compress the gas and lift the pin off the seat to allow fluid flow through the valve. But when the downhole pressure decreases when less pump pressure is needed topside to maintain the flow rate the gas will expand to allow the pin to regulate and seal against the valve seat to avoid hydrostatic fall-through. The fluid to be injected then enter one or more check valves which are the primary barrier against the well into the valve and to topside.

In particular, the invention relates to a flow tube. This is a portion of a backpressure valve system in which the fluid path between the fluid input and output of the valve is regulated. This is accomplished by a pin that can be moved in and out of a seal opening within the flow tube. When the pin is within the seal opening, the valve is in a closed position and flow through the tube is reduced or eliminated. When the pin is not within the seal opening, the valve is in an open position and flow through the tube is allowed. If the pin is partially within the seal opening, partial flow is allowed.

It is possible for these kinds of valves to fail for a wide range of reasons. One such reason is that the valve pickup, a portion of the pin that is grabbed by the valve pin pickup, brakes off. Due to this, the valve can no longer operate in the manner for which it was designed. When the current valve types for this application fail, a portion of the pin is arranged within the seal area and it is no longer possible for fluid to flow, or only partial flow is allowed. This can be referred to as "fail closed". This is undesirable in cases where it is preferred for fluid flow to continue. Note that it is not easy, if not almost impossible, to recover a valve that has failed.

From a practical point of view, these valves are generally very durable and tend to fail late in their lifetime and in the lifetime of the well. The pressure of the hydrocarbon fluids produced from the well is usually lower late in the lifetime of the well compared to earlier. In such a case, it is preferable for the valve to simply let all fluid flow through the valve rather than to fail closed. The wells do not have the same pressure problems that they may have earlier in their life cycle and can be left permanently open for chemical injection. In other words, it can be desirable for a valve to be arranged such that it can "fail open".

SHORT SUMMARY OF THE INVENTION

As described above, current valves do not always behave in a desirable manner upon failure. It is therefore an object of the present invention to provide a flow tube that can be forced open after failure if desired.

In one aspect, the present invention relates to a flow tube including: a pin; a seat; and a guide tube, the pin and the seat are arranged at least partially in the guide tube; and wherein: the flow tube is arranged to have a closed position, wherein: the pin is in contact with the seat and fluid flow through the seat is reduced or prevented; the flow tube is arranged to have an open position, wherein: the pin is not in contact with the seat and fluid flow is increased through the seat when compared to the closed position; and the flow tube is arranged to have a forced open position, wherein: the seat is arranged such that when a force above a threshold force is applied to the seat: the seat moves away from the pin, the pin is not in contact with the seat, and the flow tube cannot move to the closed position again.

In some aspects, when the flow tube is in the open and closed position, the seat is stationary with respect to the guide tube.

In some aspects, the flow tube further includes a seat support, wherein the seat support supports the seat. More preferably the seat support supports the seat when in the closed position, open position, and forced open position.

In some aspects relating to the flow tube, the seat support body and the seat are in contact when in the forced open position and/or the closed position and/or the open position.

In some aspects relating to the flow tube, the seat support allows the seat to move into the forced open position.

In some aspects relating to the flow tube, the seat support further includes a seat support side and a seat support body, wherein: the seat support is arranged such that the seat support side and the seat support body separate along a shear line when the flow tube moves into the forced open position, and the seat support side remains stationary with respect to the guide tube.

In some aspects relating to the flow tube, the seat support side is arranged between the guide tube and the seat when the flow tube is in the forced open position.

In some aspects relating to the flow tube, the seat support side guides the seat to the forced open position.

In some aspects relating to the flow tube, the seat support is a shear ring.

In some aspects relating to the flow tube, the seat is held in place by a snap ring when in the forced open position. In some aspects relating to the flow tube, the snap ring is arranged between the guide tube and the seat in the forced open position. In some aspects relating to the flow tube, the snap ring is arranged between the seat and the seat support in the forced open position. In some aspects relating to the flow tube, the snap ring is arranged between the seat and the seat support side when in the forced open position.

In some aspects relating to the flow tube, the seat further includes a seat body and a seat shoulder on the seat body, and the snap ring is arranged such that it is in contact with the seat shoulder when in the forced open position.

In some aspects relating to the flow tube, a sealing element is arranged between the seat and guide tube In one aspect, the present invention relates to a valve system including: a flow tube, a valve housing, a catch screen module, valve block, flow outlet, a back pressure regulation module, wherein: the flow tube is arranged in the valve housing, a fluid enters the catch screen module and exits through the flow outlet, a valve block connects the catch screen module and the flow outlet, a back pressure regulation module, aids in moving the flow tube from an open position wherein fluid is allowed to flow to a closed position wherein less fluid flows through the valve system when compared to the open position.

BRIEF DESCRIPTION OF THE FIGURES

The above and further features of the invention are as set forth with particularity in the appended claims, and advantages thereof will become clearer upon consideration of the following detailed description. Embodiments of the present invention will now be described, by way of example only, with reference to the following diagrams wherein:

REFERENCE NUMBERS AND CORRESPONDING ELEMENTS

10 Pin
11 Pin Body
12 Valve Pickup
13 Pin Gap
14 Pin Shoulder
20 Seat
21 Seat Body
22 Seal Opening
23 Seat Bore
24 Seat Shoulder
30 Seat Support
31 Seat Support Sides
32 Shear Line
33 Seat Support Body
34 Seat Support Bore
35 Seat Support Gap
36 Seat Support Shoulder
40 Guide Tube
41 Guide Tube Body
42 Fluid Input
43 Fluid Output
44 Housing
45 Fluid Path
50 O-Ring
51 Snap Ring
52 Snap Ring Groove
60 Valve System
61 Valve Housing
62 Catch Screen Module
63 Valve Block
64 Flow Outlet
65 Back Pressure Regulating Module
70 Valve Pin Pick Up
100 Flow Tube

DETAILED DESCRIPTION OF THE INVENTION

Reference will now be made in detail to the present embodiments of the invention, examples of which are illustrated in the accompanying drawings. Alternative embodiments will also be presented. The drawings are intended to be read in conjunction with both the summary, the detailed description, and an any preferred and/or particular embodiments, specifically discussed or otherwise disclosed. This invention may, however, be embodied in many different forms and should not be construed as limited to the embodiments set forth herein. These embodiments are provided by way of illustration only. Several further embodiments, or combinations of the presented embodiments, will be within the scope of one skilled in the art.

Direction terms such as up, down, left, right, above, below, etc. are being used in reference to the orientation of the elements in the figures. In no way is this intended as limiting.

The flow tube is a portion of a valve system. The flow tube is in a closed position when a portion of the pin blocks the opening through the seat. The area at which the opening is located is referred to as a seal opening. In the closed position, the pin is arranged to block the seal opening. In the open position, the pin is arranged such that a least a portion of fluid can flow through the seal opening. To put the valve in a fail open state, the seat is supported by a seat support. Force applied to the seat is transferred through the seat to the seat support. When enough force is applied to the seat, the seat support is arranged to allow the seat to move. The seat then moves far enough from the pin such that it is not possible for the pin to block the sealing opening. In this manner the flow tube is now in a forced open position and the valve is now "failed open".

Figure 1A:
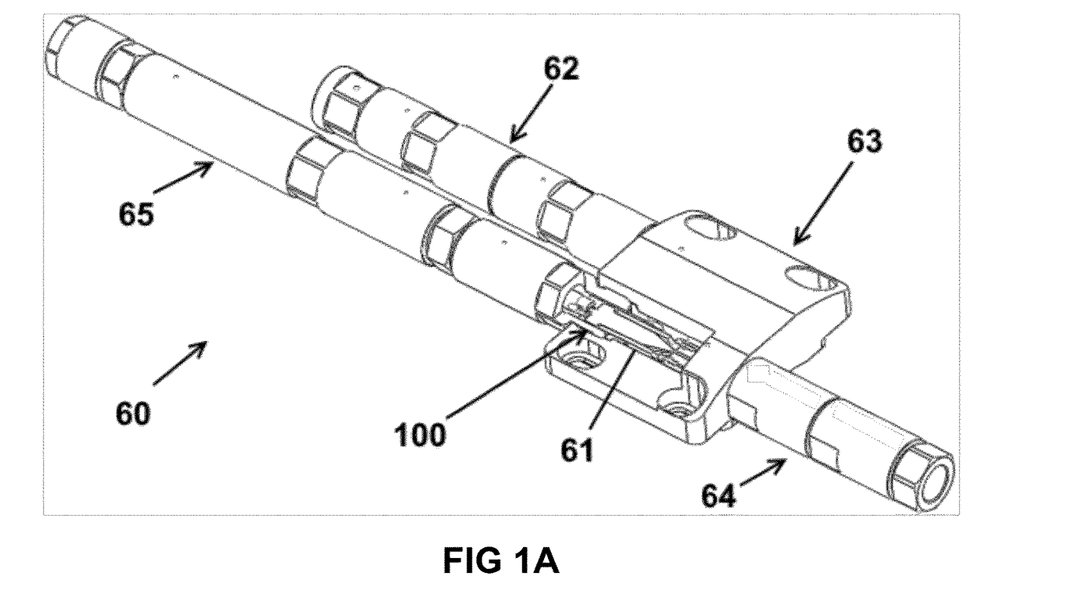
FIG. 1A discloses a flow tube in a valve system

Reference is made to FIG. 1A. This discloses a flow tube 100 as a part of a valve system 60. A flow tube 100 is arranged in a valve housing 61 in the valve system 60. Fluid enters the system through the catch screen module 62 and exits through the flow outlet 64. A back pressure regulating module 65 is arranged such that aids in the movement of the flow tube 100 between an open and closed position. It is often a pre-charged gas chamber acting as a spring or some other spring/mechanism providing pressure and can include a fluid dampening system (e.g. bellows). The valve block 63 connects various parts of the valve system 60 together. Note that some of the other modules, for example the flow outlet 64, can have it's own valve block.

Figure 1B:
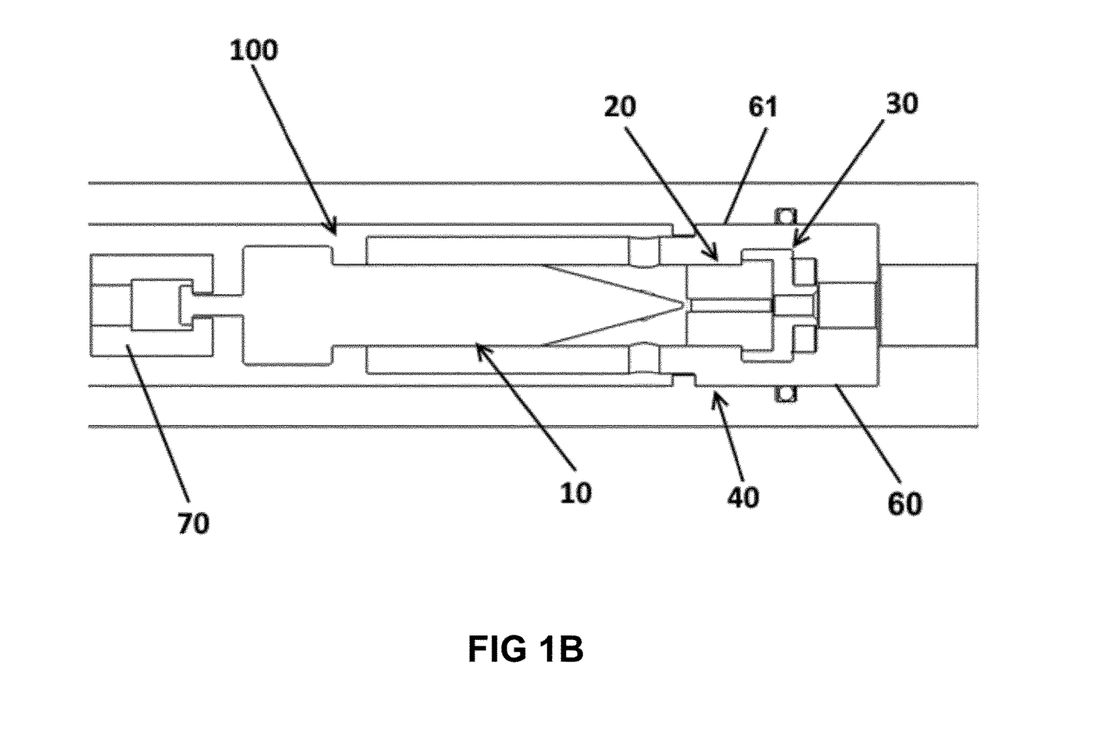
FIG. 1B discloses a flow tube arranged in a valve housing

Reference is made to FIG. 1B. This discloses a flow tube 100 arranged in a valve housing 61. The flow tube 100 comprises a pin 10, a seat 20, a seat support 30, and a guide tube 40. The pin 10 is arranged such that at least a portion of the pin 10 is in the guide tube 40. The pin 10 is arranged to be moved with respect to the seat 20. In the example shown, this moving is accomplished using a valve pin pick up 70. When the pin 10 is in contact with the seat 20, the fluid flow through the system is prevented (or lessened). The guide tube 40 is arranged such that it lessens the chance that the pin 10 will not land correctly on the seat 20. The seat support 30 supports the seat 20 and prevents it from moving during the normal functioning of the valve system, when the valve is operated to be closed or open (fully or partially) to control the fluid injection. As will be discussed later, the seat support 30 is arranged such that it can allow for the seat 20 to move away from the pin 10 (show as to the left on FIG. 1A). This will be discussed in more detail later.

Figure 1C:
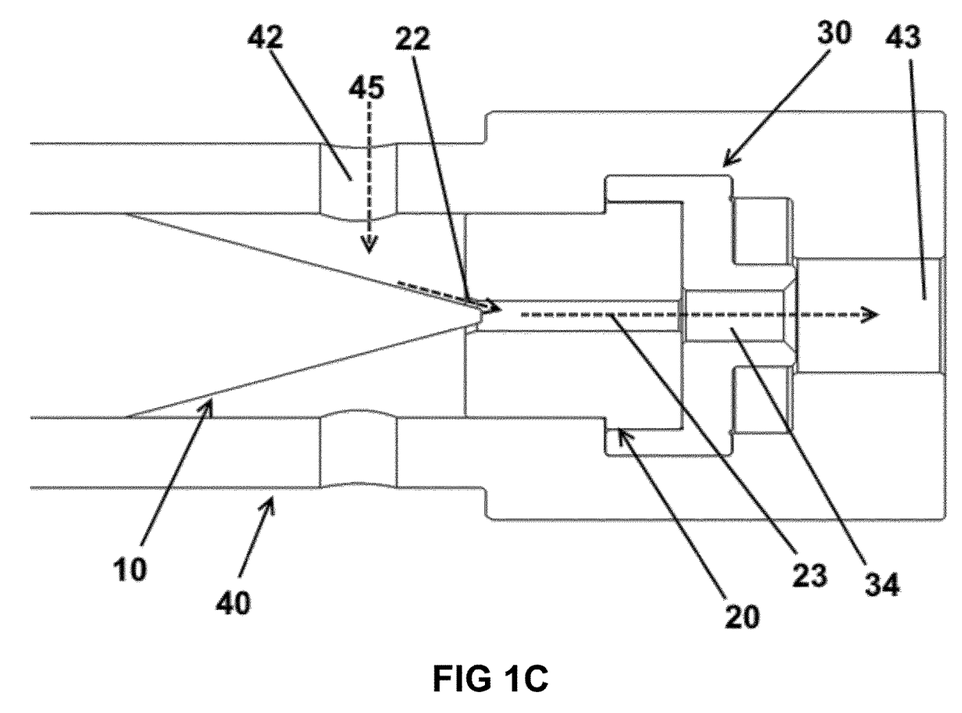
FIG. 1C discloses a flow path through a flow tube in the open position

Reference is made to FIG. 1C. This discloses a flow path 45 through a flow tube in the open position. Fluid enters through the fluid input 42 in the guide tube 40, flows through the gap between the pin 10 and the seat 20 henceforth called the seal opening 22. Fluid continues to flow through a seat bore 23 in the seat support 30, through the seat support bore 34, and out of the flow tube 100 through the fluid output 43 in the guide tube 40. This flow path 45 is indicated on the figure with an arrowed dotted line.

Figure 2A:
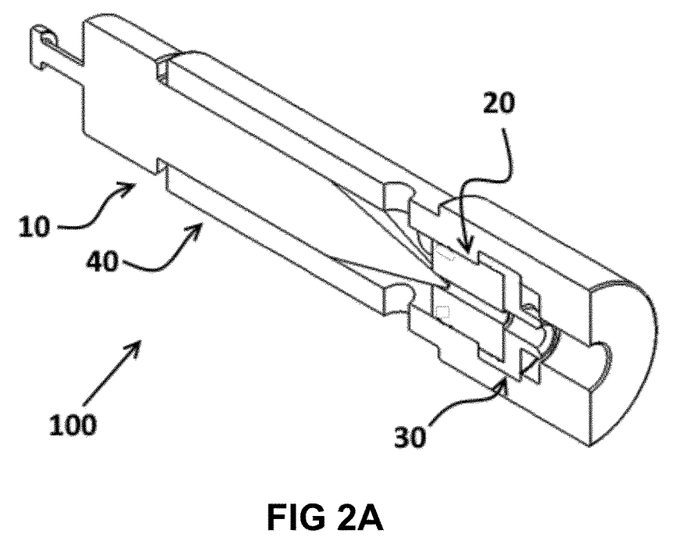
FIG. 2A discloses a perspective view of an example of a flow tube in the closed position FIGS. 2B-2D disclose an example of a flow tube in the closed, open, and forced open position, respectively.

Reference is made to FIG. 2A. This discloses a perspective view of an example of a flow tube in the closed position. The pin 10 is arranged partially within the guide tube 40. In this figure, the pin 10 is in contact with the seat 20, preventing fluid flow through the pin 10. The seat support 30 supports the seat 20 and prevents it from moving. The pin 10 is arranged to move along the longitudinal axis of the guide tube 40.

Figure 2B:
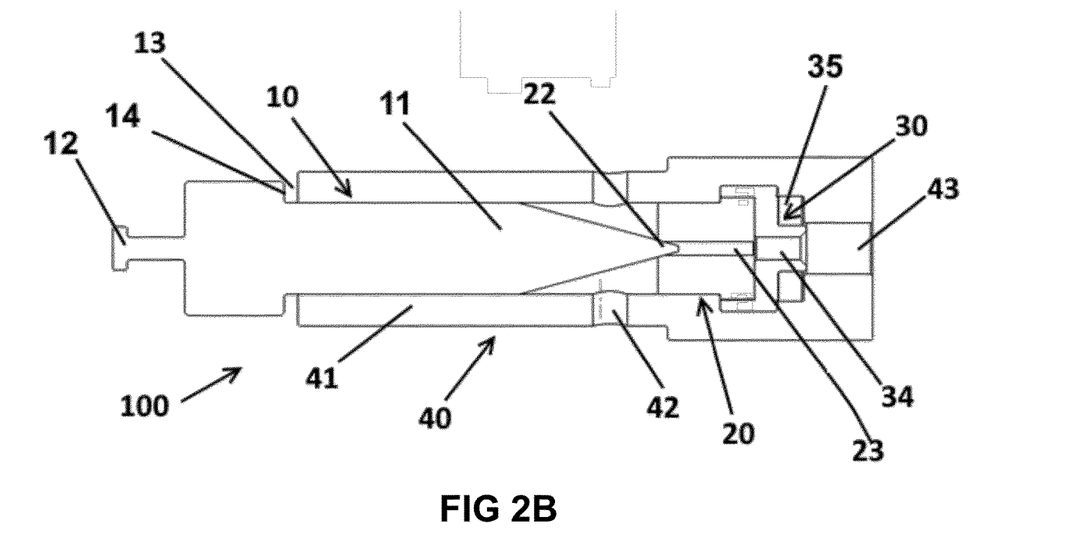
Figure 2C:
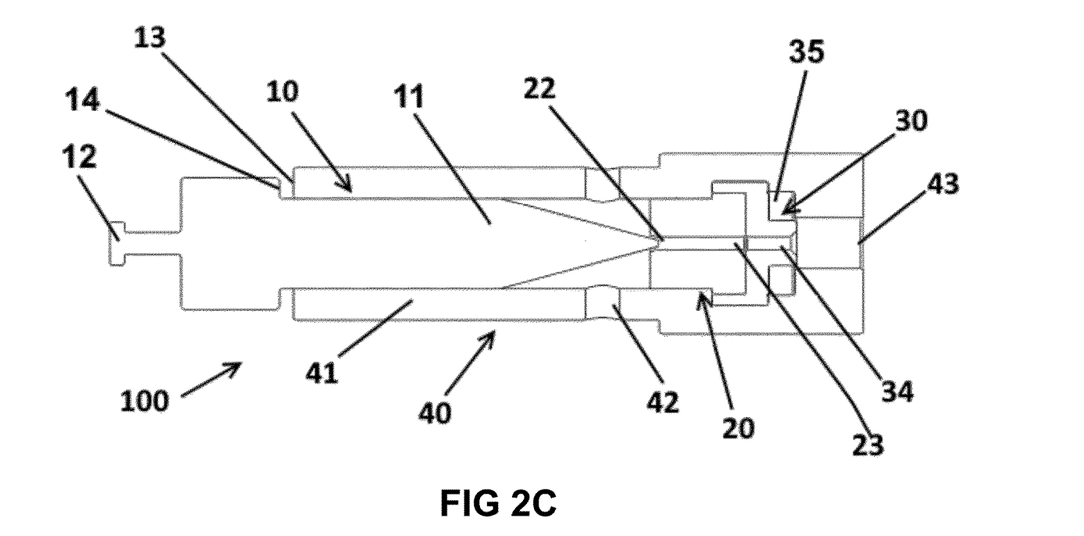
Figure 2D:
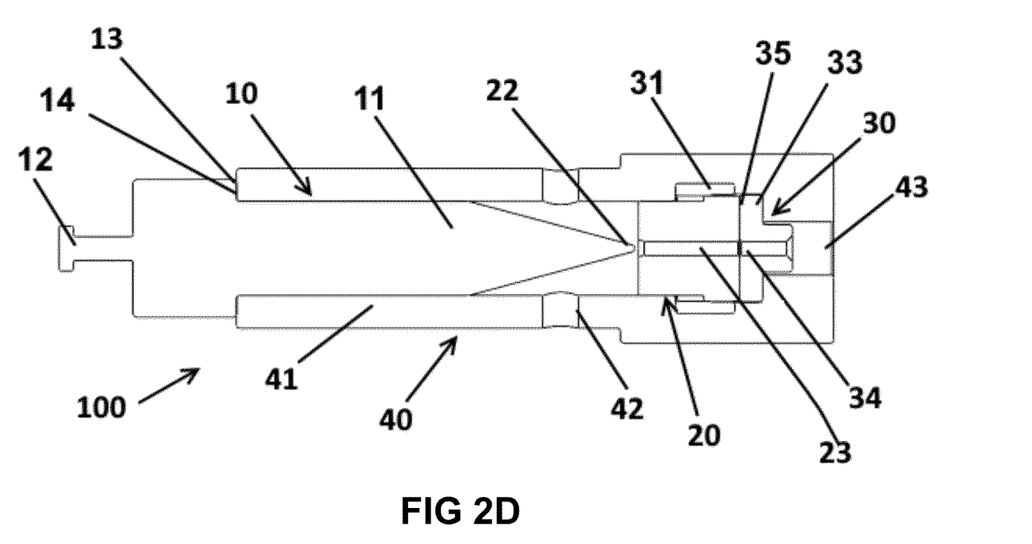

Reference is made to FIGS. 2B-2D. These disclose an example of a flow tube 100 in the closed, open, and forced open position. The pin 10 comprises a pin body 11 and a valve pickup 12. In this example, the valve pickup 12 is where the pin 10 is moved. In FIG. 1A this was done with a valve pin pick up 70. The guide tube comprises a guide tube body 41 that is shown in contact with pin body 11. As discussed previously there is a fluid input 42 and fluid output 43 through the guide tube 40. There is a pin gap 13 which is a space between the pin 10 and the guide tube 40.

The seat 20 has a seat bore 23 to allow fluid to travel through the seat 20. A seal opening 22 is at the entrance to the seat bore 23. It is arranged to receive the pin 10 in order to reduce (or stop) or allow fluid flow through the seat 20. The seat 20 is supported by the seat support 30. The fluid passes through the seat support bore 34. There is a seat support gap 35 between the seat support 30 and the guide tube 40.

In FIG. 2B, the flow tube 100 is in the closed position. In this position, the end of the pin 10 is inside of the seat bore 23 and blocking the seal opening 22. FIG. 2C shows the flow tube 100 in the open position. The pin 10 is not inside of the seat bore 23 and the seal opening 22 is open. The size of the pin gap 13 increases when going from the closed to the open position. The size of the seat support gap 35 remains the same.

FIG. 2D shows the flow tube 100 in the forced open position. In this position, there is little to no pin gap 13 as the pin shoulder 14 of the pin 10 is in contact with the guide tube 40. There is also little to no seat support gap 35 as the seat support 30 is in contact with guide tube 40. The seat support 30 has separated into two pieces: a seat support side 31 and a seat support body 33. The seat support body 33 is in contact with the seat 20. The seat support 30 no longer can support the seat 20 and the seat 20 moves away from the pin 10 and toward the fluid output 43. Because the seat support gap 35 is larger than the pin gap 13 in the open or closed position, the seat 20 will travel farther than the pin 10, thus the pin 10 cannot enter the seat bore 23 and close off the seal opening 22. During the transition from the closed position to the forced open position, guidance of the seat 20 is aided by the seat support side 31.

The seat support 30 is arranged such than when enough force is applied, the seat support 30 will allow seat 20 to move away from the pin 10. In the example shown the seat support 30 breaks into a seat support side 31 which stays in place and a seat support body 33 which moves. The figures show that the seat support side 31 comes up at least partially to the sides of the seat 20, however by seat support side 31 is it meant that it is the portion of the seat support 30 that remains stationary with respect to the guide tube 40 when in the forced open position. This can be thought of as the portion of the seat support 30 that remains in place when the seat support body 33 separates from the seat support 30

While the seat 20 is shown as stationary with respect to the guide tube 40 when in the open and closed positions, this is not a requirement. It is possible for both the seat 20 and pin 10 to move with respect to the guide tube 40 in the open or closed position. The position is defined by the relative position of the pin 10 with respect to the seat 20. In the open position, the pin 10 is not in contact with the seat 20 and in the closed position the pin 10 is in contact with the seat 20. It is possible for the pin and the seat 20 to both move with respect to the guide tube 40 in either position.

While the seat 20 is shown always in contact with the seat support 30 in all positions, this is not a requirement. It is possible for the seat 20 to be in contact in one of the positions and not the others. In the forced open position, the seat 20 is in contact with the seat support 30.

One way to apply enough force is through the force applied by the pin 10 itself. Another way is to increase the fluid pressure against the seat 20 (e.g. more fluid pressure from topside) until it reaches the threshold force. To apply force from topside is the preferred way of moving the seat 20. In this matter, when desired, such as may be the case in the event of valve failure, the pressure of the injected fluids can simply be increased by pumping from topside until the seat support 30 breaks and the valve system is left in a forced open position allowing for fluid injection.

One way that the flow tube 100 can fail is if the valve pickup 12 breaks off. Depending upon the flow tube 100 configuration, this will put the flow tube 100 into a closed position. Force could be applied to the seat 20 to move it into the forced open position. In this manner the flow tube 100 has been forced open and will not be able to close again. In plain language, the flow tube has "failed open", or been "pumped open".

In the above description, it was disclosed that in the example of FIG. 2C, the pin 10 and the seat support 30 both stopped when they came in contact with the guide tube 40. However, it does not have to be the guide tube that the seat support 30 or pin 10 stops against in the forced open position. For example, it could be an element arranged toward the center from the valve housing 61. In another example, it could also be an element arranged between the guide tube 40 and the pin 10 and/or seat support 30.

Normally the flow tube 100 will be in the closed position before the flow tube 100 is moved into the forced open position. However, it is possible that a high enough force could be applied to the seat 20 that the seat support 30 would allow for the seat 20 to move while the flow tube 100 is in an open or partially open position.

Figure 3A:
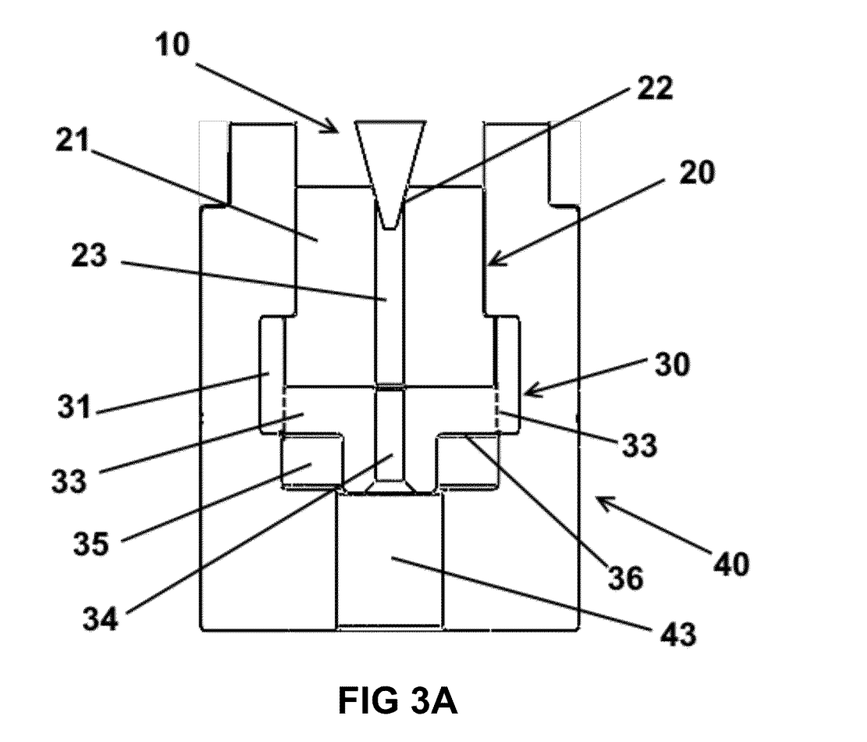
FIGS. 3A-3C disclose a closeup view of the seat and seat support of a flow tube in the closed, open, and forced open position, respectively.
Figure 3B:
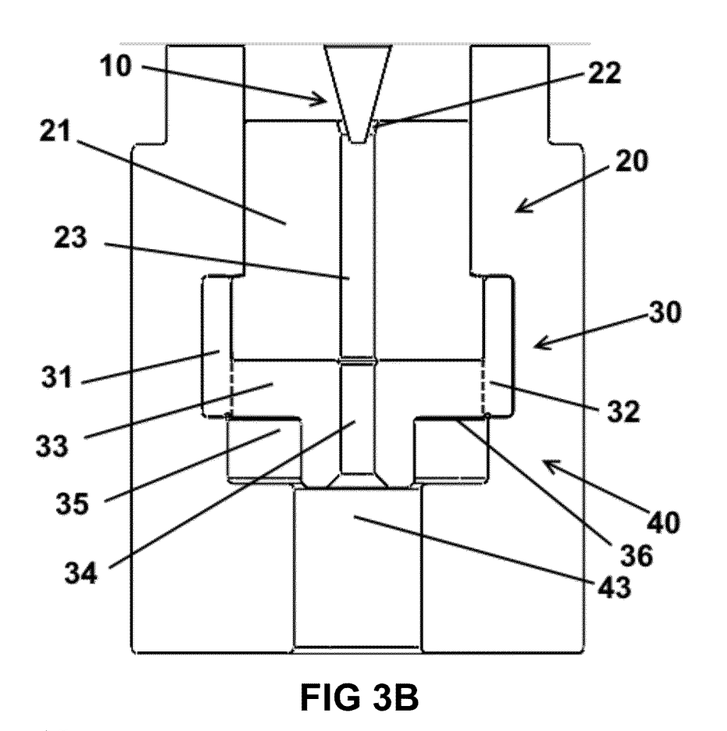
Figure 3C:
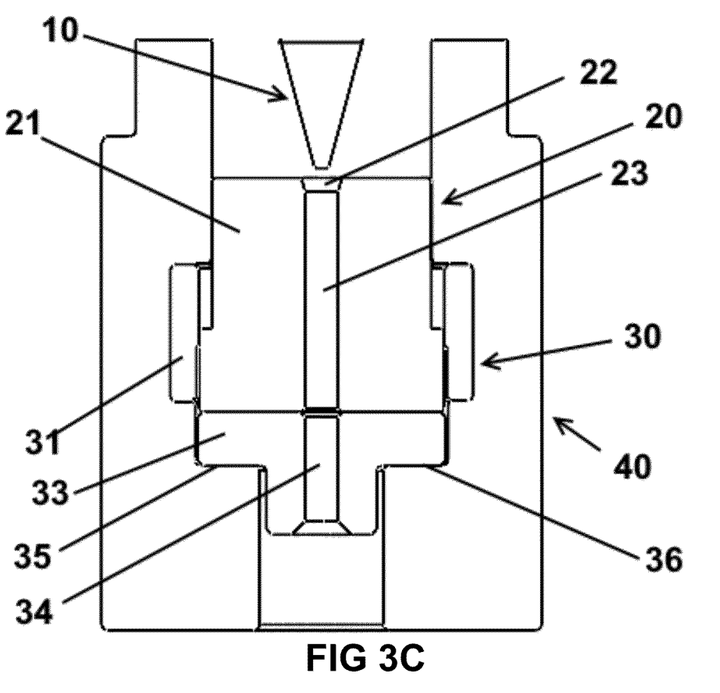

Reference is made to FIGS. 3A-3C, disclosing a closeup view of the seat and seat support of a flow tube in the closed, open, and forced open position. In FIG. 3A, the flow tube 100 is in the closed position, in FIG. 3B, the flow tube 100 is in the open position, and in FIG. 3C, the flow tube 100 is in the forced open position.

These disclose a closeup view of the seat 20 and seat support 30 of a flow tube 100 in the closed, open, and forced open position. As in the previous figures of FIGS. 1A-1B and FIGS. 2A-2D, the pin 10 is arranged within the flow tube 100. A portion of the pin 10 is arranged such that it can enter (closed position) and exit (open position) the seat bore 23 at the seal opening 22. The seat 20 and the seat support 30 are arranged within a housing in the guide tube 40. The seat 20 comprises a seat body 21 and a seat bore 23 through the seat body 21. A seat support 30 is arranged to support the seat 20.

The seat support 30 comprises a seat support side 31 and a seat support body 33. When enough force is applied, the seat support side 31 will separate from seat support body 33 at the shear line 32. The seat support 30 further comprises a seat support shoulder 36. The seat support shoulder 36 is the portion of the seat support which stops the seat support 30 when it is in the forced open position. As seat support 30 is in contact with guide tube 40, the seat support gap 35 is effectively gone. In the forced open position, the pin 10 is not in contact with the seal opening 22 and fluid can flow around the pin 10. The applied force could be applied to the seat 20 and/or the seat support 30.

In one example, the seat support 30 is a shear ring. This is a component that is designed to shear along a shear line 32 into two pieces when enough force is applied. Another example would be to use shear pins between the seat support side 31 and seat support body 33. The shear ring or pins can be calibrated to shear at a particular predetermined pressure. Another example would be to design a portion of the seat support side 31 so that it crumples when force is applied in a manner that would move the pin 10 away from the seal opening 22 in the forced open position.

It is not a requirement that the seat 20 and the seat support 30 are separate elements, and it would be possible to combine these into a single element. Having the seat 20 and the seat support 30 as separate elements makes calibration easier, as only the seat support 30 would have to be calibrated to shear or otherwise break at a particular applied force, while the seat 20 could remain unchanged. It also allows the seat 20 and the seat support 30 to be made of different materials, as the material best suited to receive the pin 10 and allow repeated motion and handle fluids under pressure may not be the best material for a clean, predictable shear or break. Thus, the seat support 30 is not essential. The seat 20 itself could be arranged such that a portion of it is sheared off when enough force was applied. Another example would be that the seat support 30 was affixed to the housing 44 using shear pins or other items designed to break when enough force is applied, rather than it itself shearing or otherwise breaking into multiple parts.

The specific examples given in the figures have the seat support 30 separating into a seat support side 31 and a seat support body 33, however it can separate into more than two pieces. The number of pieces is not important, only that the seat support 30 is arranged such that it allows the seat 20 to move when enough force is applied to the seat 20.

Figure 4A:
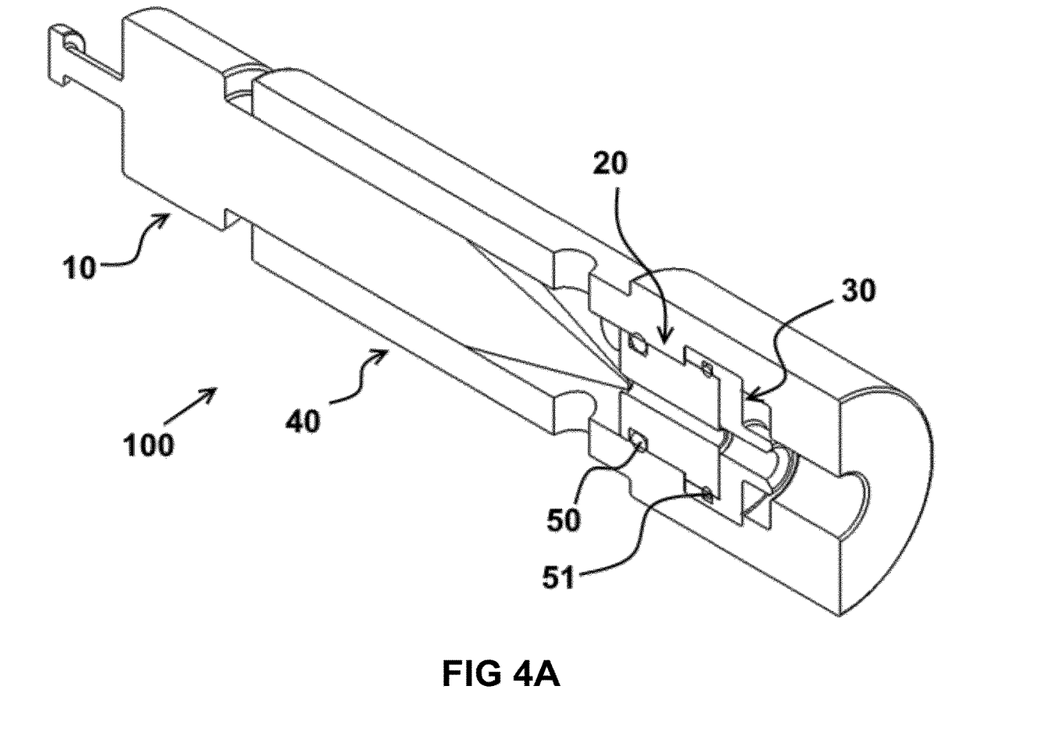
FIG. 4A discloses a perspective view of another example of a flow tube

Reference is made to FIG. 4A. This figure discloses a perspective view of another example of a flow tube 100 in an open position. This example is similar to the examples disclosed in the previous figures. The pin 10 is partially inside of a guide tube 40. The seat 20 is supported by the seat support 30. But in this case, a sealing element 50 (e.g. O-ring) is arranged between the seat 20 and the guide tube 40 and provides a fluid seal (though in some cases, it doesn't need to be entirely fluid tight).

Another example of a sealing method between the seat 20 and the guide tube 40 is by shrink fitting by means of thermally expanding the guide tube 40 and forcing the seat 20 to provide a fluid seal (though in some cases, it doesn't need to be entirely fluid tight).

There is also a snap ring 51 arranged in the seat support 30. The snap ring 51 is arranged such that when the flow tube 100 enters the forced open position, the snap ring 51 engages such that the seat 20 is unable to move back toward the pin 10 again.

Figure 4B:
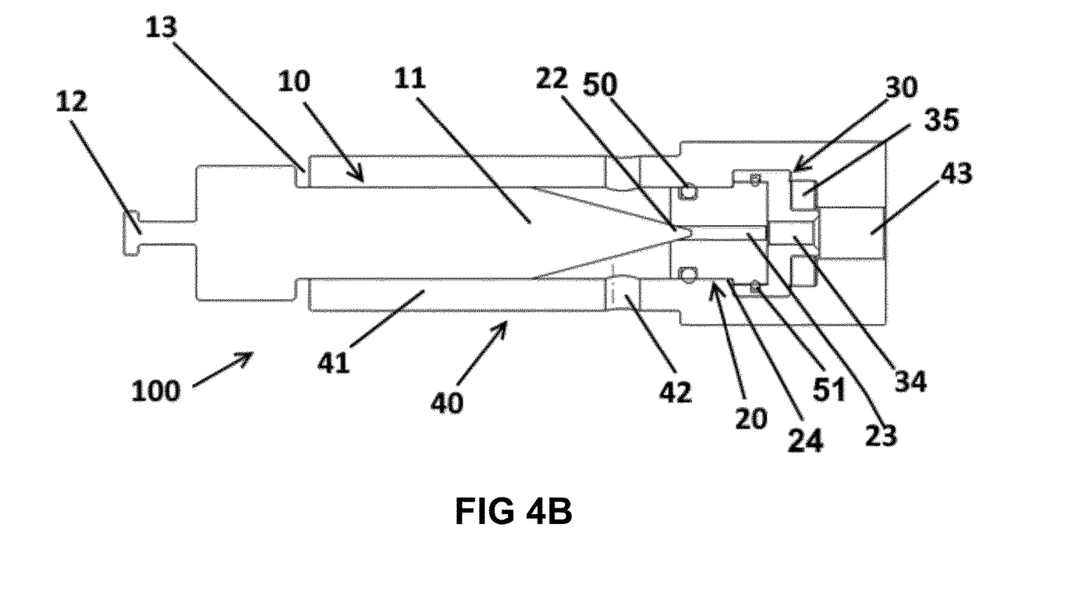
FIGS. 4B-4D disclose an example of a flow tube in the closed, open, and forced open position, respectively.
Figure 4C:
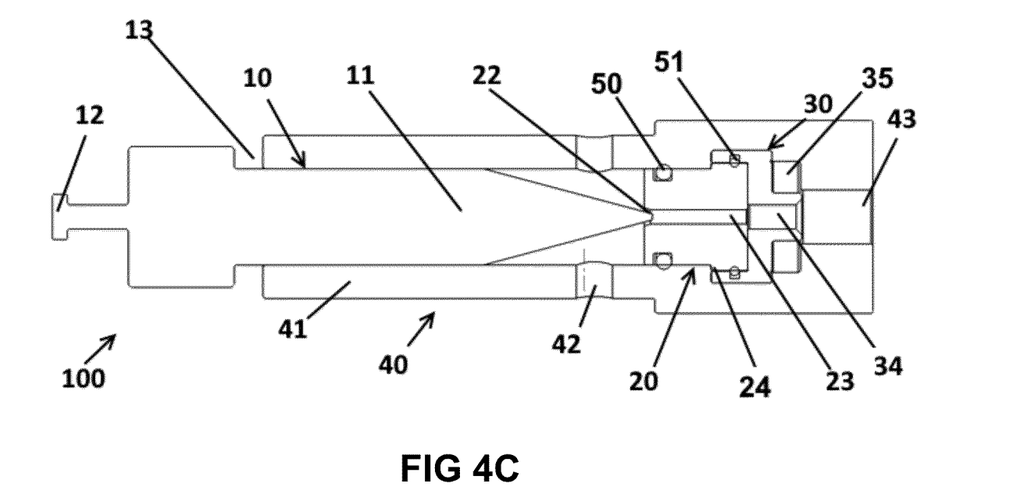
Figure 4D:
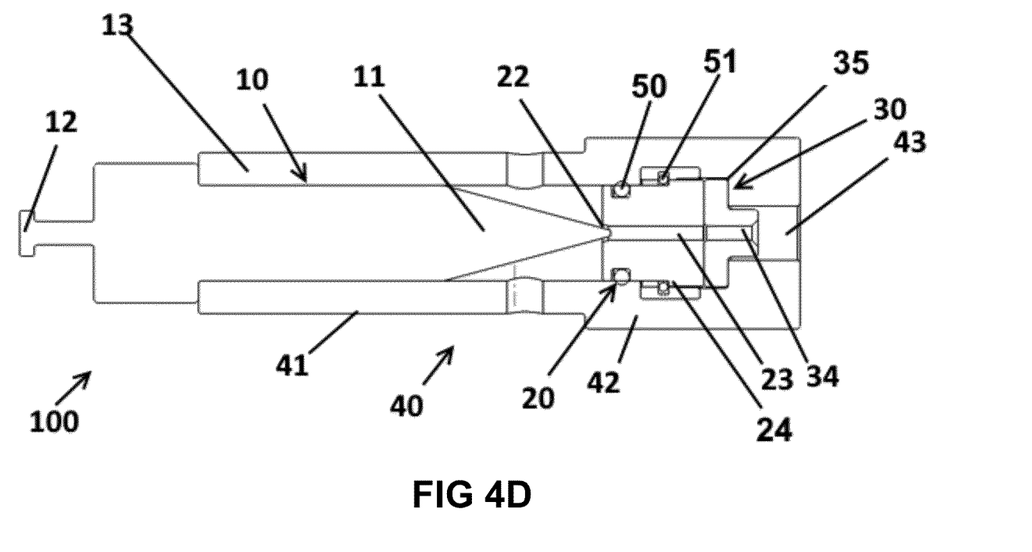

Reference is made to FIGS. 4B-4D. These disclose an example of a flow tube in the closed (FIG. 4B), open (FIG. 4C), and forced open position (FIG. 4D). The reference numbers correspond to that as disclosed in FIGS. 2B-2D. When the flow tube 100 is in the open or closed positions, the snap ring does not have any effect. However, when the flow tube 100 enters the forced open position, the snap ring will expand and contact the seat shoulder 24. This prevents the seat 20 from moving back.

Figure 5A:
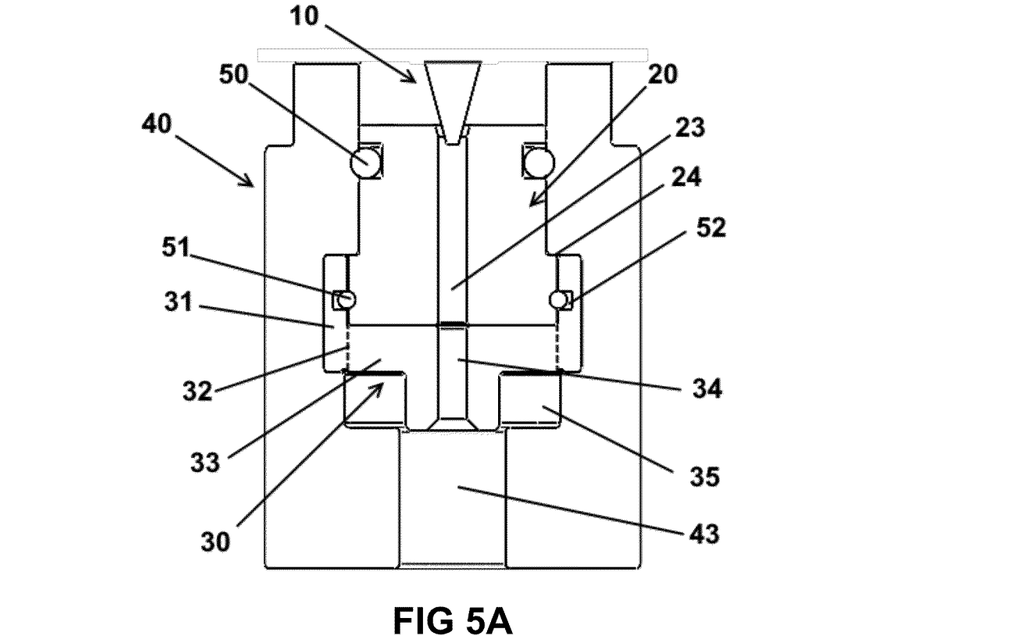
FIGS. 5A-5B disclose a closeup view of the seat and seat support of an example of a flow tube in the closed and forced open position.
Figure 5B:
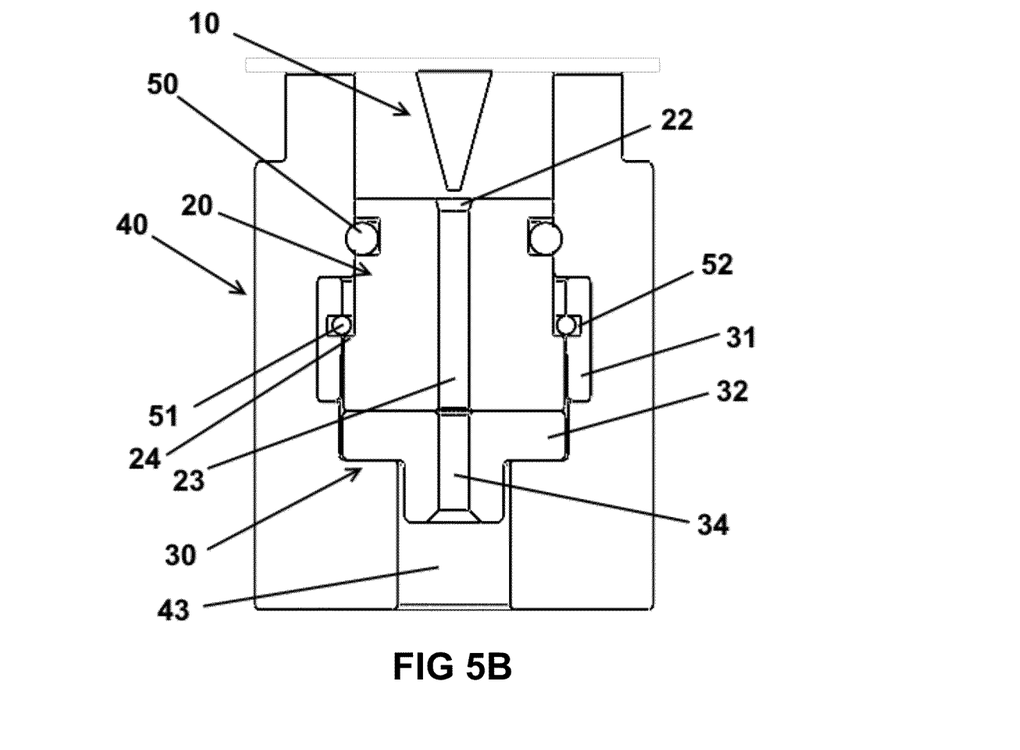

Reference is made to FIGS. 5A-5B. These disclose a closeup view of the seat and seat support of an example of a flow tube in the closed and forced open position. In the closed position a portion of the pin 10 is within the seat bore 23, blocking the seal opening 22. This prevents any fluid from flowing through the seal opening 22, seat bore 23, seat support bore 34, and exiting through the fluid output 43. There is arranged a sealing element 50 between the guide tube 40 and the seat 20. This is one way ay to make the flow tube 100 fluid tight. In the closed position the seat shoulder 24 is shown in in contact with the guide tube 40, and the seat support shoulder 36 and the guide tube 40 is separated by the seat support gap 35. A snap ring 51 is arranged in the seat support 30 between the seat support side 31 and seat support body 33 along the shear line 32.

When in the forced open position as shown in FIG. 5B, the seal opening 22 is unsealed. The seat support gap 35 is small enough that the pin 10 cannot block the seal opening 22. The seat support side 31 and seat support body 33 have separated along the shear line 32. The seat 20 has traveled far enough that the snap ring 51 within the seat support side 31 has expanded such that it is in contact with the seat shoulder 24. In this manner, the seat 20 cannot return to its previous position.

While the snap ring 51 shown in the figures is arranged between the seat support side 31 and the seat 20 in a snap ring groove 52, this is only one example. Another example is that the snap ring 51 can be situated between the guide tube 40 and the seat 20. In another example, the snap ring 51 can enter a groove in the seat 20, rather than lock in above the seat shoulder 24. The snap ring 51 is not an essential feature. It is often sufficient with friction between the seat 20 and the housing 44 to hold the seat 20 in place.

Please note that "step of" is not to be interpreted as "step for". By "comprised of", "comprising", "comprises" etc. we are referring to an open set and by "consisting of" we are referring to a closed set.

Modifications to the embodiments previously described are possible without departing from the scope of the invention as defined by the accompanying claims. Numerals included within parentheses in the accompanying claims are intended to assist understanding of the claims and should not be construed in any way to limit the subject matter claimed. Reference to the singular is also to be construed as relating to the plural unless expressly stated otherwise. Any reference numbers in the claims are provided as a courtesy and are not to be interpreted as limiting the claim in any way.

The invention claimed is:

1. A flow tube (100) comprising:
   a pin (10);
   a seat (20); and
   and a guide tube (40),
   the pin (10) and the seat (20) are arranged at least partially in the guide tube (40); and
   wherein:
   the flow tube (100) is arranged to have a closed position, wherein:
      the pin (10) is in contact with the seat (20) and fluid flow through the seat (20) is reduced or prevented;
   the flow tube (100) is arranged to have an open position, wherein:
      the pin (10) is not in contact with the seat (20) and fluid flow is increased through the seat (20) when compared to the closed position; and
   the flow tube (100) is arranged to have a forced open position, wherein:
      the seat (20) is arranged such that when a force above a threshold force is applied to the seat (20):
         the seat (20) moves away from the pin (10),
         the pin (10) is not in contact with the seat (20), and
         the flow tube (100) cannot move to the closed position again.

2. The flow tube (100) according to claim 1, wherein in the open and closed position, the seat (20) is stationary with respect to the guide tube (40).

3. The flow tube (100) according to claim 1, further comprising a seat support (30), wherein the seat support (30) supports the seat (20).

4. The flow tube (100) according to claim 3, wherein the seat support (30) supports the seat when in the closed position, open position, and forced open position.

5. The flow tube (100) according to claim 3, wherein the seat support (30) allows the seat (20) to move into the forced open position.

6. The flow tube (100) according to claim 3, wherein the seat support (30) further comprises a seat support side (31) and a seat support body (33), wherein:
   the seat support (30) is arranged such that the seat support side (31) and the seat support body (33) separate along a shear line (32) when the flow tube (100) moves into the forced open position, and
   the seat support side (31) remains stationary with respect to the guide tube (40).

7. The flow tube (100) according to claim 6, wherein the seat support side (31) is arranged between the guide tube (40) and the seat (20) when the flow tube (100) is in the forced open position.

8. The flow tube (100) according to claim 6, wherein the seat support side (31) guides the seat (20) to the forced open position.

9. The flow tube (100) according to claim 6, wherein the seat support body (33) and the seat (20) are in contact when in the forced open position and/or the closed position and/or the open position.

10. The flow tube (100) according to claim 3, wherein the seat support (30) is a shear ring.

11. The flow tube (100) according to claim 1, wherein the seat (20) is held in place by a snap ring (51) when in the forced open position.

12. The flow tube according to claim 11, wherein the snap ring (51) is arranged in one or more of the following configurations:
   a) between the guide tube (40) and the seat (20);
   b) between the seat (20) and the seat support (30);
   c) between the seat (20) and the seat support side (31).

13. The flow tube according claim 11, wherein the seat (20) further comprises a seat body (21) and a seat shoulder (24) on the seat body (21), and the snap ring (51) is arranged such that it is in contact with the seat shoulder (24) when in the forced open position.

14. The flow tube according claim 1, wherein a sealing element (50) is arranged between the seat (20) and guide tube (40).

15. A valve system (60) comprising:
   a flow tube (100) according to any of the previous claims
   a valve housing (61),
   a catch screen module (62),
   a valve block (63),
   a flow outlet (64),
   a back pressure regulation module (65),
   wherein:
      the flow tube (100) is arranged in the valve housing (61),
      a fluid enters the catch screen module (62) and exits through the flow outlet (64), the valve block (63) connects the catch screen module (62) and the flow outlet (64), the back pressure regulation module (64) aids in moving the flow tube (100) from an open position wherein fluid is allowed to flow to a closed position wherein less fluid flows through the valve system (100) when compared to the open position.

\* \* \* \* \*